D. B. ROGERS.
Wheel Cultivator.
No. 6,037.
Patented Jan. 16, 1849.
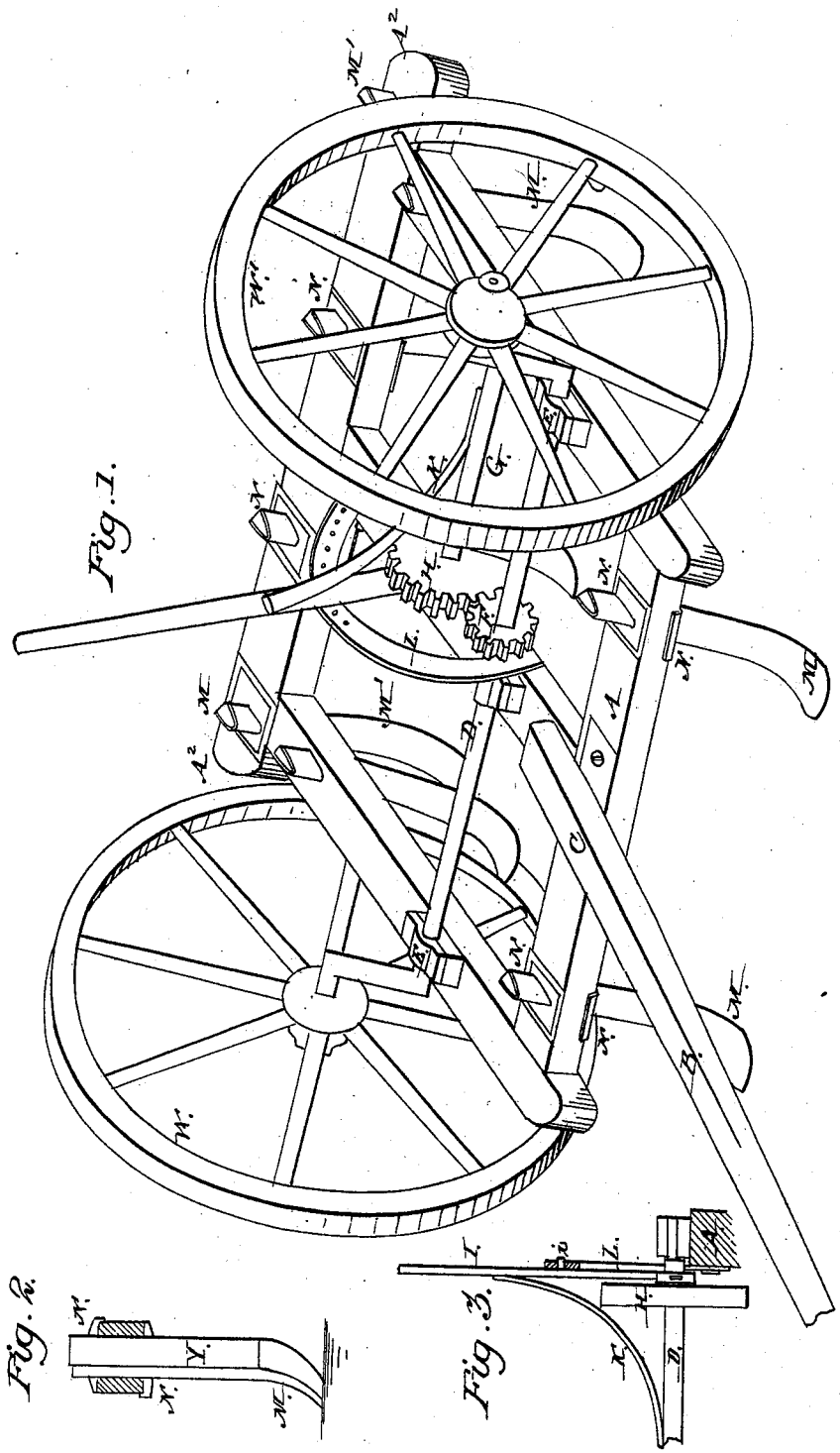

UNITED STATES PATENT OFFICE.

DAVID B. ROGERS, OF SENECA FALLS, NEW YORK.

IMPROVEMENT IN CULTIVATORS.

Specification forming part of Letters Patent No. 6,037, dated January 16, 1849.

*To all whom it may concern:*

Be it known that I, DAVID B. ROGERS, of Seneca Falls, in the county of Seneca, in the State of New York, have invented a new and useful Machine for Cultivating the Soil; and I do hereby declare that the following is a full and exact description thereof, reference being had to the annexed drawings of the same, making part of this specification.

The nature of my invention consists in a combination of known mechanical devices and principles of machinery, whereby the frame of the wheeled cultivator containing the cultivator-teeth can be readily raised above and carried over stones or other obstructions in its path and then immediately lowered again, so as to cause the teeth to plow the required depth of furrows, and by which the cultivator is firmly adjusted to plow the ground at a uniform depth, or to carry the teeth entirely above the surface in turning at the end of the land, and in other situations when it is required that the teeth should not touch the ground, the latter quality being very desirable and a great convenience in a cultivator, especially in moving it on the road to and from the field, and from field to field, in which case it saves the labor of loading and unloading it into and out of a wagon, cart, or sled—an operation so troublesome that most persons, rather than perform it, run the risk of breaking the teeth by dragging them on the road.

To enable others skilled in the art of making and using agricultural implements to make and use my invention, I will proceed to describe its construction and operation.

Figure 1 is a perspective view of the cultivator arranged for operation. Fig. 2 is a vertical section through one of the teeth, set of holding-plates, key, and transverse beam. Fig. 3 is a section of the holding-plate, lever, and cog.

Similar letters in the different figures refer to like parts.

The frame A is generally composed of five pieces of wood, and made nearly of a square form.

B is a tongue to draw the machine.

C is a staple or brace to hold the tongue to the frame.

D is a crank axle-tree, to which the wheels are affixed.

E are boxes which hold the crank axle-tree D to the frame.

F is a cog-wheel, through which the crank axle-tree D passes, and is made fast near the center of the axle-tree.

G is a short shaft running from one side piece to the center piece of the frame, and is confined by boxes in the same manner as the crank-axle.

H is a segment cog-wheel, made fast to the short shaft G.

I is a lever, which is also fastened on the short shaft G, so as to turn said shaft. K is a spring, made fast to said shaft G, and is bent so as to press the lever I against the segment-plate L, said lever having a pin or cog, $i$, projecting from its side, so as to fit the holes in the said segment plate L for the purpose of gaging the depth of the plowing to be performed by the said machine.

M are the teeth, which are made in the manner of my patented cultivator-teeth.

N are the plates which hold the teeth. These plates are of a square form, and beveled on their upper four corners to prevent the lodgment of obstructions, and turned down at right angles on the rear sides, forming narrow lips or flanges, which rest against the rear or back side of the rear transverse timber of the frame to render its connection firm with said timber and durable when bolted thereto or otherwise fastened, said plates lying horizontally in corresponding notches made in the top of said timber, each plate being perforated with a V-shaped opening corresponding with a similarly V-shaped opening in the beam, and in a similar plate placed on the under side of said timber, through which the upper end or shank of the cultivator-tooth, which is of a corresponding V shape, is inserted. The flange or lip on the under plate (whose position is inverted) comes against the front of the transverse beam. The shoulder on the upper portion of the tooth fits snug against the under side of the under plate. The cultivator-tooth being inserted, a V-shaped key, Y, is drawn into the hollow of the tooth, causing it to spread and crowd against the sides of the V-shaped openings in the plates, and thus become immovable, the metal of which the tooth is made being made thin, so as to spread when the key or wedge is driven in, as described in patent of 1845.

$A^2$ $A^2$ are the ends of the hind piece of the frame, which extends transversely on either side far enough to receive a tooth, M', behind each wheel, so as to obliterate the track of the wheel.

The manner of operating this cultivator is as follows: The horses are attached to the tongue in the usual manner and driven forward, causing the teeth to penetrate the earth to the required depth and to make the furrows in parallel lines. Should the farmer discover that the plowing is too deep, he must take hold of the lever I and bear it toward one of the wheels, W, and then draw down in the arc of a circle. This movement will cause the tooth to become disengaged from the segment holding-plate L, and the spring K to be contracted and the cogged gearing F H and crank-axle to turn, which will cause the frame and teeth to rise. He must then move the lever back against the perforated segment-plate L and bring the tooth or cog i into one of the holes therein, which will secure the frame from descending or ascending, the lever being held against the plate by the spring K. Should the farmer discover that the plowing is too shallow, he has merely to reverse the movement of the lever and bring the tooth into a hole in the segment holding-plate L at a higher point, or to increase the angle of the lever with the top of the frame, and the desired object will be attained. When he desires that the teeth shall not touch the ground he must decrease the angle of the lever with the frame and secure the lever to the perforated holding-plate, as before described. These operations are quickly and easily performed.

The machine is susceptible of the most exact adjustment. It is so very simple and durable in its construction as not to be liable to get out of order easily.

I do not claim in this application the invention of a wheeled cultivator, nor hollow wrought-iron teeth with keys driven into the hollows of the teeth; but What I do claim as my invention, and desire to secure by Letters Patent, is—

1. The mode of raising and lowering the frame A, containing the cultivator-teeth M, for the purpose of gaging the machine for deep or shallow plowing, or for moving it from place to place without causing the teeth to touch the surface of the earth by means of the before-described combination and arrangement of the crank axle-tree D, cogged wheel F, cogged segment H, short axle G, lever I, and perforated holding-plate L, employed in combination with the frame A, of cultivator-teeth M and sustaining-wheels W W.

2. The combination and arrangement of the binding and sustaining plates N, made as described, in combination with the transverse beams, as described, to which said plates are secured.

In testimony whereof I have hereunto set my hand, before two subscribing witnesses, this 20th day of September, 1847.

DAVID B. ROGERS.

Witnesses:
RAYMOND PECK,
PETER H. WATSON.